United States Patent
Hitt

(10) Patent No.: US 7,240,038 B2
(45) Date of Patent: Jul. 3, 2007

(54) HEURISTIC METHOD OF CLASSIFICATION

(75) Inventor: Ben Hitt, Severn, MD (US)

(73) Assignee: Correlogic Systems, Inc., Rockville, MD (US)

( * ) Notice: Subject to any disclaimer, the term of this patent is extended or adjusted under 35 U.S.C. 154(b) by 0 days.

(21) Appl. No.: 11/273,432

(22) Filed: Nov. 15, 2005

(65) Prior Publication Data
US 2006/0112041 A1    May 25, 2006

Related U.S. Application Data

(63) Continuation of application No. 09/883,196, filed on Jun. 19, 2001, now Pat. No. 7,096,206.

(60) Provisional application No. 60/212,404, filed on Jun. 19, 2000.

(51) Int. Cl.
G06F 15/18 (2006.01)
(52) U.S. Cl. ............... 706/12; 706/14; 706/900
(58) Field of Classification Search ............... 706/900, 706/14, 12; 600/316
See application file for complete search history.

(56) References Cited

U.S. PATENT DOCUMENTS

| | | | |
|---|---|---|---|
| 4,122,343 A | 10/1978 | Risby et al. | |
| 4,122,518 A * | 10/1978 | Castleman et al. | 382/129 |
| 4,697,242 A | 9/1987 | Holland et al. | |
| 4,881,178 A | 11/1989 | Holland et al. | |
| 5,136,686 A | 8/1992 | Koza | |
| 5,352,613 A | 10/1994 | Tafas et al. | |
| 5,553,616 A * | 9/1996 | Ham et al. | 600/316 |
| 5,649,030 A | 7/1997 | Normile et al. | |
| 5,687,716 A | 11/1997 | Kaufmann et al. | |
| 5,697,369 A | 12/1997 | Long, Jr. et al. | |
| 5,716,825 A | 2/1998 | Hancock et al. | |
| 5,719,060 A | 2/1998 | Hutchens et al. | |
| 5,790,761 A | 8/1998 | Heseltine et al. | |
| 5,839,438 A | 11/1998 | Graettinger et al. | |
| 5,905,258 A | 5/1999 | Clemmer et al. | |

(Continued)

FOREIGN PATENT DOCUMENTS

WO    WO 93/05478 A1    3/1993

(Continued)

OTHER PUBLICATIONS

Adam, B. et al., "Serum Protein Fingerprinting Coupled with a Pattern-matching Algorithm Distinguishes Prostate Cancer from Benign Prostate Hyperplasia and Healthy Men," Cancer Research, Jul. 1, 2002, pp. 3609-3614, vol. 62.

(Continued)

*Primary Examiner*—Joseph P Hirl

(57) ABSTRACT

The invention concerns heuristic algorithms for the classification of Objects. A first learning algorithm comprises a genetic algorithm that is used to abstract a data stream associated with each Object and a pattern recognition algorithm that is used to classify the Objects and measure the fitness of the chromosomes of the genetic algorithm. The learning algorithm is applied to a training data set. The learning algorithm generates a classifying algorithm, which is used to classify or categorize unknown Objects. The invention is useful in the areas of classifying texts and medical samples, predicting the behavior of one financial market based on price changes in others and in monitoring the state of complex process facilities to detect impending failures.

32 Claims, 1 Drawing Sheet

U.S. PATENT DOCUMENTS

| | | | |
|---|---|---|---|
| 5,946,640 | A | 8/1999 | Goodacre et al. |
| 5,974,412 | A | 10/1999 | Hazlehurst et al. |
| 6,025,128 | A | 2/2000 | Veltri et al. |
| 6,081,797 | A | 6/2000 | Hitt |
| 6,114,114 | A * | 9/2000 | Seilhamer et al. ............. 435/6 |
| 6,128,608 | A | 10/2000 | Barnhill |
| 6,157,921 | A | 12/2000 | Barnhill |
| 6,225,047 | B1 | 5/2001 | Hutchens et al. |
| 6,295,514 | B1 | 9/2001 | Agrafiotis et al. |
| 6,329,652 | B1 | 12/2001 | Windig et al. |
| 6,427,141 | B1 | 7/2002 | Barnhill |
| 6,493,637 | B1 * | 12/2002 | Steeg ........................ 702/19 |
| 6,558,902 | B1 | 5/2003 | Hillenkamp |
| 6,571,227 | B1 | 5/2003 | Agrafiotis et al. |
| 6,579,719 | B1 | 6/2003 | Hutchens et al. |
| 6,615,199 | B1 | 9/2003 | Bowman-Amuah |
| 6,631,333 | B1 * | 10/2003 | Lewis et al. .................. 702/24 |
| 6,675,104 | B2 | 1/2004 | Paulse et al. |
| 6,680,203 | B2 | 1/2004 | Dasseux et al. |
| 6,844,165 | B2 | 1/2005 | Hutchens et al. |
| 6,925,389 | B2 | 8/2005 | Hitt et al. |
| 2002/0046198 | A1 | 4/2002 | Hitt |
| 2002/0193950 | A1 | 12/2002 | Gavin et al. |
| 2003/0054367 | A1 | 3/2003 | Rich et al. |
| 2003/0077616 | A1 | 4/2003 | Lomas |
| 2003/0129589 | A1 | 7/2003 | Koster et al. |
| 2003/0134304 | A1 | 7/2003 | van der Greef et al. |
| 2005/0260671 | A1 | 11/2005 | Hitt et al. |

FOREIGN PATENT DOCUMENTS

| | | |
|---|---|---|
| WO | WO 99/41612 A1 | 8/1999 |
| WO | WO 99/47925 A2 | 9/1999 |
| WO | WO 99/58972 A1 | 11/1999 |
| WO | WO 00/49410 A3 | 8/2000 |
| WO | WO 00/55628 A1 | 9/2000 |
| WO | WO 01/20043 A1 | 3/2001 |
| WO | WO 01/31579 A2 | 5/2001 |
| WO | WO 01/31580 A2 | 5/2001 |
| WO | WO 01/84140 A2 | 11/2001 |
| WO | WO 02/06829 A2 | 1/2002 |
| WO | WO 02/059822 A2 | 8/2002 |
| WO | WO 02/088744 A2 | 11/2002 |
| WO | WO 03/031031 A1 | 4/2003 |

OTHER PUBLICATIONS

Alaiya, A. A. et al., "Classification of Human Ovarian Tumors Using Multivariate Data Analysis of Polypeptide Expression Patterns," Int. J. Cancer, 2000, pp. 731-736, vol. 86.

Ashfaq, R. et al., "Evaluation of PAPNET™ System for Rescreening of Negative Cervical Smears," Diagnostic Cytopathology, 1995, pp. 31-36, vol. 13, No. 1.

Astion, M. L. et al., "The Application of Backpropagation Neural Networks to Problems in Pathology and Laboratory Medicine," Arch Pathol Lab Med, Oct. 1992, pp. 995-1001, vol. 116.

Atkinson, E. N. et al., "Statistical Techniques for Diagnosing CIN Using Fluorescence Spectroscopy: SVD and CART," Journal of Cellular Biochemistry, 1995, Supplement 23, pp. 125-130.

Babaian, R. J. et al., "Performance of a Neural Network in Detecting Prostate Cancer in the Prostate-Specific Antigen Reflex Range of 2.5 to 4.0 ng/ml," Urology, 2000, pp. 1000-1006, vol. 56, No. 6.

Bailey-Kellogg, C. et al., "Reducing Mass Degeneracy in SAR by MS by Stable Isotopic Labeling," Journal of Computational Biology, 2001, pp. 19-36, vol. 8, No. 1.

Belic, I. et al., "Neural Network Methodologies for Mass Spectra Recognition," Vacuum, 1997, pp. 633-637, vol. 48, No. 7-9.

Belic, I., "Neural Networks Methodologies for Mass Spectra Recognition," pp. 375-380., additional details unknown.

Berikov, V. B. et al., "Regression Trees for Analysis of Mutational Spectra in Nucleotide Sequences," Bioinformatics, 1999, pp. 553-562, vol. 15, Nos. 7/8.

Bittl, J. A., "From Confusion to Clarity: Direct Thrombin Inhibitors for Patients with Heparin-Induced Thrombocytopenia," Catheterization and Cardiovascular Inventions, 2001, 473-475, vol. 52.

Breiman, L. et al., Classification and Regression Trees, Boca Raton, Chapman & Hall/CRC, 1984, pp. 174-265 (Ch. 6, Medical Diagnosis and Prognosis).

Brown, M. P. S. et al. "Knowledge-Based Analysis of Microarray Gene Expression Data by Using Support Vector Machines," Procedures of the National Academy of Sciences, Jan. 4, 2000, 262-267, vol. 97, No. 1.

Cairns, A. Y. et al., "Towards the Automated Prescreening of Breast X-Rays," Alistair Caims, Department of Mathematics & Computer Science, University of Dundee, pp. 1-5.

Caprioli, R. M. et al., "Molecular Imaging of Biological Samples: Localization of Peptides and Proteins Using MALDI-TOF MS," Analytical Chemistry, 1997, pp. 4751-4760, vol. 69, No. 23.

Chace, D. H. et al., "Laboratory Integration and Utilization of Tandem Mass Spectrometry in Neonatal Screening: A Model for Clinical Mass Spectrometry in the Next Millennium," Acta Paediatr. Suppl. 432, 1999, pp. 45-47.

Chang, E. I. et al., "Using Genetic Algorithms to Select and Create Features for Pattern Classification," IJCNN International Joint Conference on Neural Networks, Jun. 17-21, 1990, pp. III-747 to III-752.

Christiaens, B. et al., "Fully Automated Method for the Liquid Chromatographic-Tandem Mass Spectrometric Determination of Cyproterone Acetate in Human Plasma using Restricted Access Material for On-Line Sample Clean-Up", Journal of Chromatography A, 2004, pp. 105-110, vol. 1056.

Chun, J. et al., "Long-term Identification of Streptomycetes Using Pyrolysis Mass Spectrometry and Artificial Neural Networks," Zbl. Bakt., 1997, pp. 258-266, vol. 285, No. 2.

Cicchetti, D. V., "Neural Networks and Diagnosis in the Clinical Laboratory: State of the Art," Clinical Chemistry, 1992, pp. 9-10, vol. 38, No. 1.

Ciphergen European Update, 2001, pp. 1-4, vol. 1.

Claydon, M. A. et al., "The Rapid Identification of Intact Microorganisms Using Mass Spectrometry," Nature Biotechnology, Nov. 1996, pp. 1584-1586, vol. 14.

Claydon, M. A., et al., "The Rapid Identification of Intact Microorganisms Using Mass Spectrometry," Abstract, 1 page, [online], [retrieved on Feb. 6, 2003]. Retrieved from the internet <URL: http://www.ncbi.nlm.nih.gov/entrez/query.fcgi?cmd=Retrieve &dh=PubMed&list_uids+963...>.

Crawford, L. R. et al., "Computer Methods in Analytical Mass Spectrometry; Empirical Identification of Molecular Class," Analytical Chemistry, Aug. 1968, pp. 1469-1474, vol. 40, No. 10.

Curry, B. et al., "MSnet: A Neural Network That Classifies Mass Spectra," Stanford University, Oct. 1990, To be published in Tetrahedron Computer Methodology, pp. 1-31.

De Brabandere, V. I. et al., Isotope Dilution-Liquid Chromatography/Electrospray Ionization-Tandem Mass Spectrometry for the Determination of Serum Thyroxine as a Potential Reference Method, Rapid Communications in Mass Spectrometry, 1998, pp. 1099-1103, vol. 12.

Dhar, V., et al., Seven Methods for Transforming Corporate Data Into Business Intelligence, Upper Saddle River, N.J., Prentice Hall, 1997, pp. 52-76.

Dudoit, S. et al., "Comparison of Discrimination Methods for the Classification of Tumors using Gene Expression Data," UC Berkeley, Mar. 7, 2000, pp. 1-51, [online], [retrieved on Apr. 4, 2002]. Retrieved from the internet <URL:http://stat-www.berkeley.edu/users/terry/zarray/Html/discr.html>.

Dudoit, S. et al., "Comparison of Discrimination Methods for the Classification of Tumors Using Gene Expression Data," Mathematical Sciences Research Institute, Berkeley, CA, Technical Report# 576, Jun. 2000, pp. 1-43.

Dzeroski, S. et al., "Diterpene Structure Elucidation from 13C NMR-Spectra with Machine Learning," Boston, Kluwer Academic Publishers, Intelligent Data Analysis in Medicine and Pharmacology, 1997, pp. 207-225.

Eghbaldar, A. et al., "Identification of Structural Features from Mass Spectrometry Using a Neural Network Approach: Application to Trimethylsilyl Derivatives Used for Medical Diagnosis," J. Chem. Inf. Comput. Sci., 1996, pp. 637-643, vol. 36, No. 4.

Freeman, R. et al., "Resolution of Batch Variations in Pyrolysis Mass Spectrometry of Bacteria by the Use of Artificial Neural Network Analysis," Antonie van Leeuwenhoek, 1995, pp. 253-260, vol. 68.

Furlong, J. W. et al., "Neural Network Analysis of Serial Cardiac Enzyme Data; A Clinical Application of Artificial Machine Intelligence," American Journal of Clinical Pathology, Jul. 1991, pp. 134-141, vol. 96, No. 1.

Gaskell, S. J., "Electrospray: Principles and Practice," Journal of Mass Spectrometry, 1997, pp. 677-688, vol. 32.

George, S. E., "A Visualization and Design Tool (AVID) for Data Mining with the Self-Organizing Feature Map," International Journal on Artificial Intelligence Tools, 2000, pp. 369-375, vol. 9, No. 3.

Goodacre, R. et al., "Rapid Identification of Urinary Tract Infection Bacteria Using Hyperspectral Whole-Organism Fingerprinting and Artificial Neural Networks.," Microbiology, 1998, pp. 1157-1170, vol. 140.

Goodacre, R. et al., "Correction of Mass Spectral Drift Using Artificial Neural Networks," Analytical Chemistry, 1996, pp. 271-280, vol. 68.

Goodacre, R. et al., "Discrimination between Methicillin-Resistant and Methicillin-Susceptible Staphylococcus Aureus Using Pyrolysis Mass Spectrometry and Artificial Neural Networks," Journal of Antimicrobial Chemotherapy, 1998, pp. 27-34, vol. 41.

Goodacre, R. et al., "Identification and Discrimination of Oral Asaccharolytic Eubacterium spp. by Pyrolysis Mass Spectrometry and Artificial Neural Networks," Current Microbiology, 1996, pp. 77-84. vol. 32.

Goodacre, R. et al., "Quantitiative Analysis of Multivariate Data Using Artificial Neural Networks: A Tutorial Review and Applications to the Deconvolution of Pyrolysis Mass Spectra," Zbl. Bakt., 1996, pp. 516-539, vol. 284.

Goodacre, et al., "Sub-species Discrimination, Using Pyrolysis Mass Spectrometry and Self-organising Neural Networks, of Propionibacterium acnes Isolated from Normal Human Skin," Zbl. Bakt., 1996, pp. 501-515, vol. 284.

Gray, N. A. B., "Constraints on 'Learning Machine' Classification Methods," Analytical Chemistry, Dec. 1976, pp. 2265-2268, vol. 48, No. 14.

Hackett, P. S. et al., "Rapid SELDI Biomarker Protein Profiling of Serum from Normal and Prostate Cancer Patients," American Association for Cancer Research (abstract only), Mar. 2000, pp. 563-564, vol. 41.

Halket, J. M. et al., "Deconvolution Gas Chromatography/Mass Spectrometry of Urinary Organic Acids—Potential for Pattern Recognition and Automated Identification of Metabolic Disorders," Rapid Communications in Mass Spectrometry, 1999, pp. 279-284, vol. 13.

Hashemi, R. R. et al., "Identifying and Testing of Signatures for Non-Volatile Biomolecules Using Tandem Mass Spectra," SIGBIO Newsletter, Dec. 1995, pp. 11-19, vol. 15, No. 3.

Hausen, A. et al., "Determination of Neopterine in Human Urine by Reversed-Phase High-Performance Liquid Chromatography," Journal of Chromatography, 1982, pp. 61-70, vol. 227.

Hess, K. R. et al., "Classification and Regression Tree Analysis of 1000 Consecutive Patients with Unknown Primary Carcinoma," Clinical Cancer Research, Nov. 1999, pp. 3403-3410, vol. 5.

Holland, J. H., "Adaptation in Natural and Artificial Systems: An Introductory Analysis with Applications to Biology, Control, and Artificial Intelligence," MIT Press, 2001, pp. 1-31 and 89-120.

Jain, A. K. et al., "Statistical Pattern Recognition: A Review," IEEE Transactions On Pattern Analysis and Machine Intelligence, Jan. 2000, pp. 4-37, vol. 22, No. 1.

Jellum, E. et al., "Mass Spectrometry in Diagnosis of Metabolic Disorders," Biomedical and Environmental Mass Spectrometry, 1988, pp. 57-62, vol. 16.

Jurs, P. C. et al., "Computerized Learning Machines Applied to Chemical Problems; Molecular Formula Determination from Low Resolution Mass Spectrometry," Analytical Chemistry, Jan. 1969, pp. 21-27, vol. 41, No. 1.

Kenyon, R. G. W. et al., "Application of Neural Networks to the Analysis of Pyrolysis Mass Spectra," Zbl. Bakt., 1997, pp. 267-277, vol. 285.

Kiem, H. et al., "Using Rough Genetic and Kohonen's Neural Network for Conceptual Cluster Discovery in Data Mining," New Directions in Rough Sets, Data Mining and Granular-Soft Computing. International Workshop, RSFDGRC Proceedings, Nov. 9, 1999, pp. 448-452.

Kohavi, R. et al., "Wrappers for Feature Subset Selection," Artificial Intelligence, 1997, pp. 273-324, vol. 97.

Kohno, H. et al., "Quantitative Analysis of Scintiscan Matrices by Computer," Japanese Journal of Medical Electronics and Biological Engineering, Aug. 1974, pp. 22-29, English Abstract.

Kohonen, T. "Self Organizing Maps," Springer Series in Information Sciences, Third Edition, 2001, pp. 1-70.

Kohonen, T. "Self-Organization and Associative Memory," Springer Series in Information Sciences, Second Edition, 1988, pp. 30-67.

Krishnamurthy, T. et al. "Detection of Pathogenic and Non-Pathogenic Bacteria by Matrix-assisted Laser Desorption/Ionization Time-of-flight Mass Spectrometry," Rapid Communications in Mass Spectrometry, 1996, pp. 883-888, vol. 10.

Lewis, R. J., "An Introduction to Classification and Regression Tree (CART) Analysis," presented at 2000 Annual Meeting of the Society for Academic Emergency Medicine in San Francisco, California, 2000, pp. 1-14.

Li, J. et al. "Proteomics and Bioinformatics Approaches for Identification of Serum Biomarkers to Detect Breast Cancer," Clinical Chemistry, 2002, pp. 1296-1304, vol. 48, No. 8.

Liotta, L. et al., "Molecular Profiling of Human Cancer," Nature Genetics, Oct. 2000, pp. 48-56, vol. 1.

Lockhart, D. J. et al., "Genomics, Gene Expressng and DNA Arrays," Nature, Jun. 2000, pp. 827-836, vol. 405.

Loging, W. T. et al., "Identifying Potential Tumor Markers and Antigens by Datase Mining and Rapid Expression Screening," Genome Research, Sep. 2000, pp. 1393-1402, vol. 10, No. 9.

Lowry, S. R. et al., "Comparison of Various K-Nearest Neighbor Voting Schemes with the Self-Training Interpretive and Retrieval System for Identifying Molecular Substructures from Mass Spectral Data," Analytical Chemistry, Oct. 1977, pp. 1720-1722, vol. 49, No. 12.

Luo, Y. et al., Quantification and Confimation of Flunixin in Equine Plasma by Liquid Chromatograph—Quadrupole Time-Of-Flight Tandem Mass Spectrometry, Journal of Chromatography B, 2004, pp. 173-184, vol. 801.

Macfie, H. J. H. et al., "Use of Canonical Variates Analysis in Differentiation of Bacteria by Pyrolysis Gas-Liquid Chromatography," Journal of General Microbiology, 1978, pp. 67-74, vol. 104.

Malins, D. C. et al., "Models of DNA Structure Achieve Almost Perfect Discrimination Between Normal Prostate, Benign, Prostatic Hyperplasia (BPH), and Adenocarcinoma and Have a High Potential for Predicting BPH and Prostrate Cancer," Proceedings of the National Academy of Sciences, Jan. 1997, pp. 259-264, vol. 94.

Marvin, L. F. et al., "Characterization of a Novel Sepia Officinalis Neuropeptide using MALDI-TOL MS and Post-Source Decay Analysis," Peptides, 2001, pp. 1391-1396, vol. 22.

Meuzelaar, H. L. C. et al., "A Technique for Fast and Reproducible Fingerprinting of Bacteria by Pyrolysis Mass Spectrometry," Analytical Chemistry, Mar. 1973, pp. 587-590, vol. 45, No. 3.

Meyer, B. et al., "Identification of the IH-NMR Spectra of Complex Oligosaccharides with Artificial Neural Networks," Science, Feb. 1991, pp. 542-544, vol. 251.

Microsoft Press, Computer Dictionary, Second Edition, The Comprehensive Standard for Business, School, Library, and Home, Microsoft Press, Redmond, WA, 1994, pp. 87 and 408.

Moler, E. J. et al., "Analysis of Molecular Profile Data Using Generative and Discriminative Methods,", Physiol. Genomics, Dec. 2000, pp. 109-126, vol. 4.

Nikulin, A. E. et al., "Near-Optimal Region Selection for Feature Space Reduction: Novel Preprocessing Methods for Classifying MR Spectra," NMR Biomedicine, 1998, pp. 209-216, vol. 11.

Nilsson, T. et al., "Classification of Species in the Genus Penicillium by Curie Point Pyrolysis/Mass Spectrometry Followed by Multivariate Analysis and Artificial Neural Networks," Journal of Mass Spectrometry, 1996, pp. 1422-1428, vol. 31.

Oh, J. M. C. et al., "A Database of Protein Expression in Lung Cancer," -Proteomics, 2001, pp. 1303-1319, vol. 1.

Paweletz, C. P. et al., "Rapid Protein Display Profiling of Cancer Progression Directly from Human Tissue Using a Protein Biochip," Drug Development Research, 2000, pp. 34-42, vol. 49.

Pei, M. et al. "Feature Extraction Using Genetic Algorithms," Proceedings of the 1st International Symposium on Intelligent Data Engineering and Learning, IDEAL '98, Oct. 1998, pp. 371-384, Springer, Hong Kong.

Petricoin, E. F., III et al., "Serum Proteomic Patterns for Detection of Prostate Cancer," Journal of the National Cancer Institute, Oc. 16, 2002, pp. 1576-1578, vol. 94, No. 20.

Petricoin, E. F., III et al., "Use of Proteomic Patterns in Serum to Identify Ovarian Cancer," The Lancet, Feb. 16, 2002, pp. 572-577, vol. 359.

Petricoin, E. F. et al., "Clinical Applications of Proteomics," Journal of Nutrition [online], Jul. 2003 [retrieved on Jan. 18, 2005], pp. 1-19, vol. 133, No. 7. Retrieved from the Internet: <URL: http://www.nutrition.org/cgi/content/full/133/7/2476S.

Prior, C. et al., "Potential of Urinary Neopterin Excretion in Differentiating Chronic Non-A, Non-B Hepatitis from Fatty Liver," The Lancet, Nov. 28, 1987, pp. 1235-1237.

Reed, J. "Trends in Commercial Bioinformatics," Oscar Gruss Biotechnology Review, Mar. 2000, pp. 1-20.

Reibnegger, G. et al., "Neural Networks as a Tool for Utilizing Laboratory Information: Comparison with Linear Discriminant Analysis and with Classification and Regression Trees," Proceedings of the National Academy of Sciences, Dec. 1991, pp. 11426-11430, vol. 88.

Ricketts, I. W. et al., "Towards the Automated Prescreening of Cervical Smears," Mar. 11, 1992, Applications of Image Processing in Mass Health Screening, IEE Colloquium, pp. 1-4.

Roses, A.D., "Pharmacogenetics and the Practice of Medice," Nature, Jun. 15, 2000, pp. 857-865, vol. 405.

Rosty, C. et al., "Identification of Hepatocarcinoma-Intestine-Pancreas/Pancreatitis-associated Protein I as a Biomarker for Pancreatic Ductal Adenocarcinoma by Protein Biochip Technology," Cancer Research, Mar. 15, 2002, pp. 1868-1875, vol. 62.

Salford Systems, "Salford Systems White Paper Series," pp. 1-17 [online], [retrieved on Oct. 17, 2000]. Retrieved from the internet: <URL: http//www.salford-systems.com/whitepaper.html>.

Schroll, G. et al., "Applications of Artificial Intelligence for Chemical Inference, III. Aliphatic Ethers Diagnosed by Their Low-Resolution Mass Spectra and Nuclear Magnetic Resonance Data," Journal of the American Chemical Society, Dec. 17, 1969, pp. 7440-7445.

Shaw, R. A. et al., "Infrared Spectroscopy of Exfoliated Cervical Cell Specimens," Analytical and Quantitative Cytology and Histology, Aug. 1999, pp. 292-302, vol. 21, No. 4.

Shevchenko, A. et al., "MALDI Quadupole Time-of-Flight Mass Spectrometry: A Powerful Tool for Proteomic Research," Analytical Chemistry, May 1, 2000, pp. 2132-2141, vol. 72, No. 9.

Strouthopoulos, C. et al., "PLA Using RLSA and a Neural Network," Engineering Applications of Artificial Intelligence, 1999, pp. 119-138, vol. 12.

Taylor, J. et al., "The Deconvolution of Pyrolysis Mass Spectra Using Genetic Programming: Application to the Identification of Some Eubacterium Species," FEMS Microbiology Letters, 1998, pp. 237-246, vol. 160.

Tong, C. S. et al., "Mass Spectral Search method using the Neural Network approach," International Joint Conference on Neural Networks, Washington, DC Jul. 10-16, 1999, Proceedings, vol. 6 of 6, pp. 3962-3967.

Tong, C. S. et al., "Mass spectral search method using the neural network approach," Chemometrics and Intelligent Laboratory Systems, 1999, pp. 135-150, vol. 49.

Von Eggeling, F. et al, "Mass Spectrometry Meets Chip Technology: A New Proteomic Tool in Cancer Research?," Electrophoresis, 2001, pp. 2898-2902, vol. 22, No. 14.

Voorhees, K. J. et al., "Approaches to Pyrolysis/Mass Spectrometry Data Analysis of Biological Materials," in: Meuzelaar, H. L. C., Computer-Enhanced Analytical Spectroscopy, vol. 2, New York, Plenum Press, 1990, pp. 259-275.

Werther, W. et al., "Classification of Mass Spectra; a Comparison of Yes/No Classification Methods for the Recognition of Simple Structural Properties," Chemometrics and Intelligent Laboratory Systems, 1994, pp. 63-76, vol. 22.

Wythoff, B. J. et al., "Spectral Peak Verification and Recognition Using a Multilayered Neural Network," Analytical Chemistry, Dec. 15, 1990, pp. 2702-2709, vol. 62, No. 24.

Xiao, Z. et al., Quantitation of Serum Prostate-Specific Membrane Antigen by a Novel Protein Biochip Immunoassay Discriminates Benign from Malignant Prostate Disease, Cancer Research, Aug. 15, 2001, pp. 6029-6033, vol. 61.

Yao, X. et al. "Evolving Artificial Neural Networks for Medical Applications," Proceedings of the First Korea-Australia Joint Workshop on Evolutionary Computation, Sep. 1995, pp. 1-16.

Yates, J. R. III, "Mass Spectrometry and the Age of the Proteome," Journal of Mass Spectrometry, 1998, pp. 1-19, vol. 33.

Zhang, J., Dynamics and Formation of Self-Organizing Maps,: in Obermayer, H. et al., "Self-Organizing Map Formation: Foundations of Neural Computation," Oct. 2001, pp. 55-67.

Zhang, Z. "Combining Multiple Biomarkers in Clinical Diagnostics—A Review of Methods and Issues," Center for Biomarker Discovery, Department of Pathology, Johns Hopkins Medical Institutions, 14 pages.

Zhang, Z. et al., "Proteomics and Bioinformatics Approaches for Identification of Serum Biomarkers to Detect Breast Cancer," Clinical Chemistry, 2002, pp. 1296-1304, vol. 48, No. 8.

Langdon, W. B., Natural Language Text Classification and Filtering with Trigrams and Evolutionary Nearest Neighbour Classifiers, CWI Report, Jul. 31, 2000, pp. 1-12.

Pictet, O. V. et al., Genetic Algorithms with Collective Sharing for Robust Optimization in Financial Applications, Olsen & Associates, Research Institute for Applied Economics, Jan. 22, 1996, pp. 1-16.

* cited by examiner

HEURISTIC METHOD OF CLASSIFICATION

This application is a continuation of application Ser. No. 09/883,196, filed Jun. 19, 2001, entitled "Heuristic Method of Classification," now U.S. Pat. No. 7,096,206, the entire content of which is hereby incorporated by reference, which claims benefit under 35 U.S.C. sec. 119(e)(1) of the priority of U.S. Provisional Patent Application No. 60/212,404, filed Jun. 19, 2000, which is hereby incorporated by reference in its entirety.

FIELD OF THE INVENTION

The field of the invention concerns a method of analyzing and classifying objects which can be represented as character strings, such as documents, or strings or tables of numerical data, such as changes in stock market prices, the levels of expression of different genes in cells of a tissue detected by hybridization of mRNA to a gene chip, or the amounts of different proteins in a sample detected by mass spectroscopy. More specifically, the invention concerns a general method whereby a classification algorithm is generated and verified from a learning data set consisting of pre-classified examples of the class of objects that are to be classified. The pre-classified examples having been classified by reading in the case of documents, historical experience in the case of market data, or pathological examination in the case of biological data. The classification algorithm can then be used to classify previously unclassified examples. Such algorithms are generically termed data mining techniques. The more commonly applied data mining techniques, such as multivariate linear regression and non linear feed-forward neural networks have an intrinsic shortcoming, in that, once developed, they are static and cannot recognize novel events in a data stream. The end result is that novel events often get misclassified. The invention concerns a solution to this shortcoming through an adaptive mechanism that can recognize novel events in a data stream.

BACKGROUND OF THE INVENTION

The invention uses genetic algorithms and self organizing adaptive pattern recognition algorithms. Genetic algorithms were described initially by Professor John H. Holland. (J. H. Holland, *Adaptation in Natural and Artificial Systems*, MIT Press 1992, see also U.S. Pat. No. 4,697,242 and No. 4,881,178). A use of a genetic algorithm for pattern recognition is described in U.S. Pat. No. 5,136,686 to Koza, see column 87.

Self organizing pattern recognition has been described by Kohonen. (T. Kohonen, *Self Organizing and Associative Memory*, 8 *Series in Information Sciences*, Springer Verlag, 1984; Kohonen, T, *Self-organizing Maps*, Springer Verlag, Heidelberg 1997). The use of self organizing maps in adaptive pattern recognition was described by Dr. Richard Lippman of the Massachusetts Institute of Technology.

SUMMARY OF THE INVENTION

The invention consists of two related heuristic algorithms, a classifying algorithm and a learning algorithm, which are used to implement classifying methods and learning methods. The parameters of the classifying algorithm are determined by the application of the learning algorithm to a training or learning data set. The training data set is a data set in which each item has already been classified. Although the following method is described without reference to digital computers, it will be understood by those skilled in the art that the invention is intended for implementation as computer software. Any general purpose computer can be used; the calculations according to the method are not unduly extensive. While computers having parallel processing facility could be used for the invention, such processing capabilities are not necessary for the practical use of the learning algorithm of the invention. The classifying algorithm requires only a minimal amount of computation.

The classifying method of the invention classifies Objects according to a data stream that is associated with the Object. Each Object in the invention is characterized by a data stream, which is a large number, at least about 100 data points, and can be 10,000 or more data points. A data stream is generated in a way that allows for the individual datum in data streams of different samples of the same type of Object to be correlated one with the other.

Examples of Objects include texts, points in time in the context of predicting the direction of financial markets or the behavior of a complex processing facility, and biological samples for medical diagnosis. The associated data streams of these Objects are the distribution of trigrams in the text, the daily changes in price of publicly traded stocks or commodities, the instantaneous readings of a number of pressure, temperature and flow readings in the processing facility such as an oil refinery, and a mass spectrum of some subset of the proteins found in the sample, or the intensity mRNA hybridization to an array of different test polynucleotides.

Thus, generically the invention can be used whenever it is desired to classify Objects into one of several categories, e.g., which typically is two or three categories, and the Objects are associated with extensive amounts of data, e.g., typically thousands of data points. The term "Objects" is capitalized herein to indicate that Objects has a special meaning herein in that it refers collectively to tangible objects, e.g., specific samples, and intangible objects, e.g., writings or texts, and totally abstract objects, e.g., the moment in time prior to an untoward event in a complex processing facility or the movement in the price of a foreign currency.

The first step of the classifying method is to calculate an Object vector, i.e., an ordered set of a small number of data points or scalers (between 4 and 100, more typically between 5 and 30) that is derived from the data stream associated with the Object to be classified. The transformation of the data steam into an Object vector is termed "abstraction." The most simple abstraction process is to select a number of points of the data stream. However, in principle the abstraction process can be performed on any function of the data stream. In the embodiments presented below abstraction is performed by selection of a small number of specific intensities from the data stream.

In one embodiment, the second step of the classifying method is to determine in which data cluster, if any, the vector rests. Data clusters are mathematical constructs that are the multidimensional equivalents of non-overlapping "hyperspheres" of fixed size in the vector space. The location and associated classification or "status" of each data cluster is determined by the learning algorithm from the training data set. The extent or size of each data cluster and the number of dimensions of the vector space is set as a matter of routine experimentation by the operator prior to the operation of the learning algorithm. If the vector lies within a known data cluster, the Object is given the classification associated with that cluster. In the most simple embodiments the number of dimensions of the vector space is equal to the number of data points that is selected in the abstraction process. Alternatively, however, each scaler of the Object vector can be calculated using multiple data points of the data stream. If the Object vector rests outside of any known cluster, a classification can be made of atypia, or atypical sample.

In an alternative embodiment, the definition of each data cluster as a hypersphere is discarded and the second step is performed by calculating the match parameter $\Delta = \Gamma \,(\min\,(|I_i|, |W_i|)/\Gamma(|W_i|)$, where $I_i$ are the scalers of the Object vector and $W_i$ are the scalers of the centroid of the preformed classifying vector. The match parameter $\Delta$ is also termed a normalized "fuzzy" AND. The Object is then classified according to the classification of the preformed vector to which it is most similar by this metric. The match parameter is 1 when the Object vector and the preformed vector are identical and less than 1 in all other cases.

The learning algorithm determines both the details of abstraction process and the identity of the data clusters by utilizing a combination of known mathematical techniques and two pre-set parameters. A user pre-sets the number of dimensions of the vector space and the size of the data clusters or, alternatively, the minimum acceptable level of the "fuzzy AND" match parameter $\Delta$. As used herein the term "data cluster" refers to both a hypersphere using a Euclidean metric and preformed classified vectors using a "fuzzy AND" metric.

Typically the vector space in which the data clusters lie is a normalized vector space so that the variation of intensities in each dimension is constant. So expressed the size of the data cluster using a Euclidean metric can be expressed as minimum percent similarity among the vectors resting within the cluster.

In one embodiment the learning algorithm can be implemented by combining two different types of publicly available generic software, which have been developed by others and are well known in the field: (1) a genetic algorithm (J. H. Holland, *Adaptation in Natural and Artificial Systems*, MIT Press 1992) that processes a set of logical chromosomes[1] to identify an optimal logical chromosome that controls the abstraction of the data steam and (2) an adaptive self-organizing pattern recognition system (see, T. Kohonen, *Self Organizing and Associative Memory*, 8 Series in Information Sciences, Springer Verlag, 1984; Kohonen, T, *Self-organizing Maps*, Springer Verlag, Heidelberg 1997), available from Group One Software, Greenbelt, Md., which identifies a set of data clusters based on any set of vectors generated by a logical chromosome. Specifically the adaptive pattern recognition software maximizes the number of vectors that rest in homogeneous data clusters, i.e., clusters that contain vectors of the learning set having only one classification type.

To use a genetic algorithm each logical chromosome must be assigned a "fitness." The fitness of each logical chromosome is determined by the number of vectors in the training data set that rest in homogeneous clusters of the optimal set of data clusters for that chromosome. Thus, the learning algorithm of the invention combines a genetic algorithm to identify an optimal logical chromosome and an adaptive pattern recognition algorithm to generate an optimal set of data clusters and a fitness calculation based on the number of sample vectors resting in homogeneous clusters. In its broadest embodiment, the learning algorithm of the invention consists of the combination of a genetic algorithm, a pattern recognition algorithm and the use of a fitness function that measures the homogeneity of the output of the pattern recognition algorithm to control the genetic algorithm.

To avoid confusion, it should be noted that the number of data clusters is much greater than the number of categories. The classifying algorithms of the examples below sorted Objects into two categories, e.g., documents into those of interest and those not of interest, or the clinical samples into benign or malignant. These classifying algorithms, however, utilize multiple data clusters to perform the classification. When the Object is a point in time, the classifying algorithm may utilize more than two categories. For example, when the invention is used as a predictor of foreign exchange rates, a tripartite scheme corresponding to rising, falling and mixed outlooks would be appropriate. Again, such a tripartite classifying algorithm would be expected to have many more than three data clusters.

DETAILED DESCRIPTION OF THE INVENTION

Figure 1:
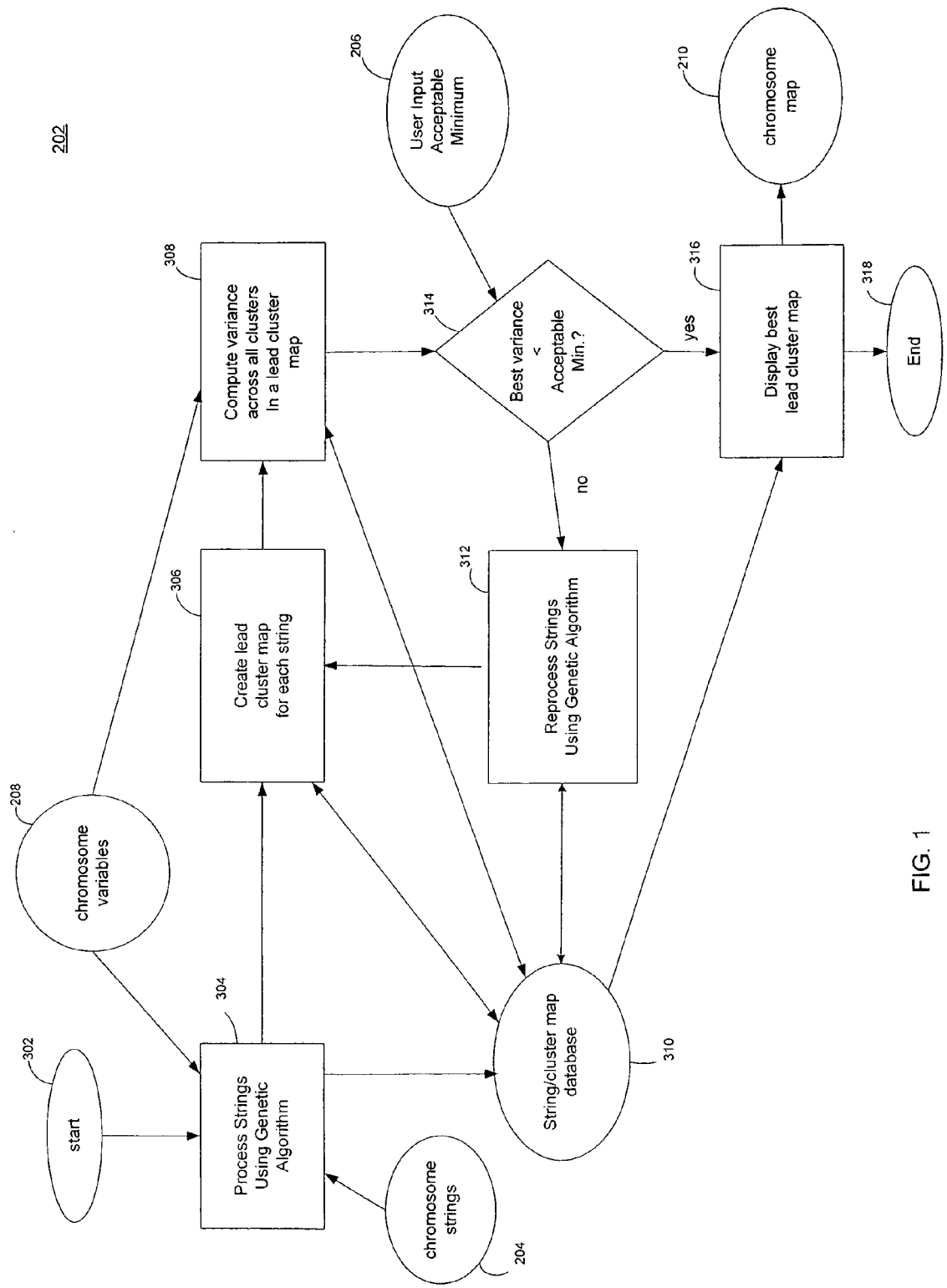
FIG. 1 is a control flow diagram according to one embodiment of the invention.

In order to practice the invention the routine practitioner must develop a classifying algorithm by employing the learning algorithm. As with any heuristic method, some routine experimentation is required. To employ the learning algorithm, the routine practitioner uses a training data set and must experimentally optimize two parameters, the number of dimensions and the data cluster size.

Although there is no absolute or inherent upper limit on the number of dimensions in the vector, the learning algorithm itself inherently limits the number of dimensions in each implementation. If the number of dimensions is too low or the size of the cluster is too large, the learning algorithm fails to generate any logical chromosomes that correctly classify all samples with an acceptable level of homogeneity. Conversely, the number of dimensions can be too large. Under this circumstance, the learning algorithm generates many logical chromosomes that have the maximum possible fitness early in the learning process and, accordingly, there is only abortive selection. Similarly, when the size of the data clusters is too small, the number of clusters will be found to approach the number of samples in the training data set and, again, the routine practitioner will find that a large number of logical chromosomes will yield a set of completely homogeneous data clusters.

Although the foregoing provide general guidance for the selection of the number of dimensions and the data cluster size for a classifying algorithm, it should be understood that the true test of the value of a classifying algorithm is its ability to correctly classify data streams that are independent of the data stream in the training data set. Therefore, the routine practitioner will understand that a portion of the learning data set must be reserved to verify that the classification algorithm is functioning with an error rate, that is acceptable for the intended purpose. The particular components of the invention are described in greater detail below.

A. The Data Stream and Types of Objects

The classification of Objects and the generation of the associated data stream depend upon the nature of the problem to be addressed. The general principles are illustrated by the following examples.

Documents: In one embodiment the invention provides a method for the computerized classification documents. For example, one may want to extract the documents of interest from a data base consisting of a number of documents too large to review individually. For these circumstances, the invention provides a computerized algorithm to identify a subset of the database most likely to contain the documents of interest. Each document is an Object, the data stream for each document consists of the histogram representing the frequency of each of the 17576 ($26^3$) three letter combinations (trigrams) found in the document after removal of spaces and punctuation. Alternatively, a histogram of the 9261 trigrams of consonants can be prepared after the further removal of vowels from the document. The training data set consists of a sample of the appropriate documents that have been classified as "of interest" or "not of interest," according to the needs of the user.

Financial Markets: It is self-evident that financial markets respond to external events and are interrelated to each other in a consistent fashion; for example, foreign exchange rates are influenced by the attractiveness of investment opportunities. However, the direction and extent of the response to an individual event can be difficult to predict. In one embodiment, the invention provides an algorithm computerized prediction of prices in one market based on the movement in prices in another. Each point in time is an Object, for example hourly intervals, the data stream for hour consists of the histogram of the change in price of publicly traded securities in the major stock markets in the relevant countries, e.g., the New York and London stock exchanges where the exchange rate of the pound and dollar are of interest. The training data set consists of the historical record such price changes that has been classified as preceding a rise or fall in the dollar:pound rate.

Processing Facilities: In a complex processing facility, such as an oil refinery, oil field or petrochemical plant, the pressure, temperature, flow and status of multiple valves and other controls (collectively the "status values") are constantly monitored and recorded. There is a need to detect impending untoward events before the untoward event becomes a catastrophic failure. The present invention provides a computerized algorithm to classify each point in time as either a high-risk or normal-risk time point. The data stream consists of the status values for each point in time. The training data set consists of the historical record of the status values classified as either preceding an untoward event or as preceding normal operation.

Medical Diagnosis: The invention can be used in the analysis of a tissue sample for medical diagnosis, e.g., for analysis of serum or plasma. The data stream can be any reproducible physical analysis of the tissue sample that results in 2,000 or more measurements that can be quantified to at least 1 part per thousand (three significant figures). Time of flight mass spectra of proteins are particularly suitable for the practice of the invention. More specifically, matrix assisted laser desorption ionization time of flight (MALDI-TOF) and surface enhanced laser desorption ionization time of flight (SELDI-TOF) spectroscopy. See generally WO 00/49410.

The data stream can also include measurements that are not inherently organized by a single ordered parameter such as molecular weight, but have an arbitrary order. Thus, DNA microarray data that simultaneously measures the expression levels of 2,000 or more genes can be used as a data stream when the tissue sample is a biopsy specimen, recognizing that the order of the individual genes is the data stream is arbitrary.

Specific diseases where the present invention is particularly valuable occur when early diagnosis is important, but technically difficult because of the absence of symptoms and the disease may be expected to produce differences that are detectable in the serum because of the metabolic activity of the pathological tissue. The early diagnosis of malignancies are a primary focus of the use of the invention. The working example illustrates the diagnosis of prostatic carcinoma, similar trials for the diagnosis of ovarian cancers have been performed.

It should be noted that a single data stream from a patient sample can be analyzed for multiple diagnoses using the method of the invention. The additional cost of such multiple analysis would be trivial because the steps specific to each diagnosis are computational only.

B. The Abstraction Process and Logical Chromosome

The first step in the classifying process of the invention is the transformation or abstraction of the data stream into a characteristic vector. The data may be conveniently normalized prior to abstraction by assigning the overall peak a arbitrary value of 1.0 and all other points given fractional values. The most simple abstraction of a data stream consists of the selection of a small number of data points. Those skilled in the will recognize that more complex functions of multiple points could be constructed such as averages over intervals or more complex sums or differences between data points that are at predetermined distance from a selected prototype data point. Such functions of the intensity values of the data stream could also be used and are expected to function equivalently to the simple abstract illustrated in the working examples.

The skilled will also appreciate that routine experimentation can determine whether abstraction by taking the instantaneous slope at arbitrary points could also function in the present invention. Accordingly, such routinely available variations of the illustrated working examples are within the scope of the invention.

A feature of the invention is the use of a genetic algorithm to determine the data points which are used to calculate the characteristic vector. In keeping with the nomenclature of the art, the list of the specific points to be selected is termed a logical chromosome. The logical chromosomes contain as many "genes" as there are dimensions of the characteristic vector. Any set of the appropriate number of data points can be a logical chromosome, provided only that no gene of a chromosome is duplicated. The order of the genes has no significance to the invention.

Those skilled in the art appreciate that a genetic algorithm can be used when two conditions are met. A particular solution to a problem must be able to be expressed by a set or string of fixed size of discrete elements, which elements can be numbers or characters, and the strings can be recombined to yield further solutions. One must also be able to calculate a numerical value of the relative merit of each solution, its fitness. Under these circumstances the details of the genetic algorithm are unrelated to the problem whose solution is sought. Accordingly, for the present invention, generic genetic algorithm software may be employed. The algorithms in PGAPack libraries, available from Argonne National Laboratory is suitable. The calculation of the fitness of any particular logical chromosome is discussed below.

The first illustrative example concerns a corpus of 100 documents, which were randomly divided into a training set of 46 documents and a testing set of 54 documents. The documents consisted of State of the Union addresses, selections from the book *The Art of War* and articles from the Financial Times. The distribution of trigrams for each document was calculated. A vector space of 25 dimensions and a data cluster size in each dimension of 0.35 times the range of values in that dimension was selected. The genetic algorithms were initialized with about 1,500 randomly chosen logical chromosomes. As the algorithm progressed the more fit logical chromosomes are duplicated and the less fit are terminated. There is recombination between chromosomes and mutation, which occurs by the random replacement of an element of a chromosome. It is not an essential feature of the invention that the initially selected collection of logical chromosome be random. Certain prescreening of the total set of data streams to identify those data points having the highest variability may be useful, although such techniques may also introduce an unwanted initialization bias. Those skilled in the art appreciate that the initial set of chromosomes, the mutation rate and other boundary conditions for the genetic algorithm are not critical to its function.

C. The Pattern Recognition Process and Fitness Score Generation

The fitness score of each of the logical chromosomes that are generated by the genetic algorithm is calculated. The calculation of the fitness score requires an optimal set of data clusters be generated for each logical chromosome that is tested. Data clusters are simply the volumes in the vector space in which the Object vectors of the training data set rest. The method of generating the optimal set of data clusters is not critical to the invention and will be considered below. However, whatever method is used to generate the data cluster map, the map is constrained by the following rules: each data cluster should be located at the centroid of the data points that lie within the data cluster, no two data clusters may overlap and the dimension of each cluster in the normalized vector space is fixed prior to the generation of the map.

The size of the data cluster is set by the user during the training process. Setting the size too large results in a failure find any chromosomes that can successfully classify the entire training set, conversely setting the size to low results in a set of optimal data clusters in which the number of clusters approaches the number of data points in the training set. More importantly, a too small setting of the size of the data cluster results in "overfitting," which is discussed below.

The method used to define the size of the data cluster is a part of the invention. The cluster size can be defined by the maximum of the equivalent of the Euclidean distance (root sum of the squares) between any two members of the data cluster. A data cluster size that corresponds to a requirement of 90% similarity is suitable for the invention when the data stream is generated by SELDI-TOF mass spectroscopy data. Somewhat large data clusters have been found useful for the classification of texts. Mathematically, 90% similarity is defined by requiring that the distance between any two members of a cluster is less than 0.1 of the maximum distance between two points in a normalized vector space. For this calculation, the vector space is normalized so that the range of each scalar of the vectors within the training data set is between 0.0 and 1.0. Thus normalized, the maximal possible distance between any two vectors in the vector space is then root N, where N is the number of dimensions. The Euclidean diameter of each cluster is then 0.1×root(N).

The specific normalization of the vector space is not a critical feature of the method. The foregoing method was selected for ease of calculation. Alternative normalization can be accomplished by scaling each dimension not to the range but so that each dimension has an equal variance. Non-Euclidean metrics, such as vector product metrics can be used.

Those skilled in the art will further recognize that the data stream may be converted into logarithmic form if the distribution of values within the data stream is log normal and not normally distributed.

Once the optimal set of data clusters for a logical chromosome has been generated, the fitness score for that chromosome can be calculated. For the present invention, the fitness score of the chromosome roughly corresponds to the number of vectors of the training data set that rest in clusters that are homogeneous, i.e., clusters that contain the characteristic vectors from samples having a single classification. More precisely, the fitness score is calculated by assigning to each cluster a homogeneity score, which varies from 0.0 for homogeneous clusters to 0.5 for clusters that contain equal numbers of malignant and benign sample vectors. The fitness score of the chromosome is the average fitness score of the data clusters. Thus, a fitness score of 0.0 is the most fit. There is a bias towards logical chromosomes that generate more data clusters, in that when two logical chromosomes that have equal numbers of errors in assigning the data, the chromosome that generates the greater number of clusters will have a lower average homogeneity score and thus a better fitness score.

Publicly available software for generating using the self-organizing map is has been given several names, one is a "Lead Cluster Map" and can be implemented by generic software that is available as Model 1 from Group One Software (Greenbelt, Md.).

An alternative embodiment of the invention utilizes a non-Euclidean metric to establish the boundaries of the data clusters. A metric refers to a method of measuring distance in a vector space. The alternative metric for the invention can be based on a normalized "fuzzy AND" as defined above. Soft ware that implements an adaptive pattern recognition algorithm based on the "fuzzy AND" metric is available from Boston University under the name Fuzzy ARTMAP.

D. Description and Verification of Specific Embodiments

Those skilled in the art understand that the assignment of the entire training data set into homogeneous data clusters is not in itself evidence that the classifying algorithm is effectively operating at an acceptable level of accuracy. Thus, the value of the classifying algorithm generated by a learning algorithm must be tested by its ability to sort a set of data other than the training data set. When a learning algorithm generates a classifying algorithm that successfully assigns the training data set but only poorly assigns the test data set, the training data is said to be overfitted by learning algorithm. Overfitting results when the number of dimensions is too large and/or the size of the data clusters is too small.

Document Clustering: Document (text) clustering is of interest to a wide range of professions. These include the legal, medical and intelligence communities. Boolean based search and retrieval methods have proven inadequate when faced with the rigors of the current production volume of textual material. Furthermore, Boolean searches do not capture conceptual information.

A suggested approach to the problem has been to somehow extract conceptual information in a manner that is amenable to numeric analysis. One such method is the coding of a document as a collection of trigrams and their frequency of occurrence recorded. A trigram is a collection of any three characters, such as AFV, KLF, OID, etc. There are therefore $26^3$ trigrams. White space and punctuation are not included. A document can then be represented as segmented into a specific set of trigrams starting from the beginning of the text streaming from that document. The resulting set of trigrams from that document and their frequencies are characteristic. If documents in a set have similar trigram sets and frequencies, it is likely that they concern the same topic. This is particularly true if only specific subset of trigrams are examined and counted. The question is, which set of trigrams are descriptive of any concept. A learning algorithm according to the invention can answer that question.

A corpus of 100 English language documents from the Financial Times, The Art of War and the collection of presidential State of the Union addresses was compiled. The corpus was randomly segmented into training and testing corpi. All documents were assigned a value of either 0 or 1, where 0 indicated undesirable and 1 indicated desirable. The learning algorithm searched through the trigram set and identified a set of trigrams that separated the two classes of documents. The resultant model was in 25 dimensions with the decision boundary set at 0.35 the maximal distance allowed in the space. The classifying algorithm utilizes only 25 of the possible 17,576 trigrams. On testing the results in the table obtained.

TABLE

A Confusion Matrix. Actual values are read vertically and the results of an algorithm according to the invention are read horizontally.

| | Actual Classification 0 | 1 | Totals |
|---|---|---|---|
| Assigned Classification 0 | 22 | 2 | 24 |
| 1 | 6 | 24 | 30 |
| Totals | 28 | 26 | 54 |

The results show that algorithm correctly identified 24 of the 26 documents that were of interest and correctly screened out or rejected 22 of the 26 documents that were not of interest.

Evaluation of Biological States: The above-described learning algorithm was employed to develop a classification for prostatic cancer using SELDI-TOF mass spectra (MS) of 55 patient serum samples, 30 having biopsy diagnosed prostatic cancer and prostatic serum antigen (PSA) levels greater than 4.0 ng/ml and 25 normals having PSA levels below 1 ng/ml. The MS data was abstracted by selection of 7 molecular weight values.

A cluster map that assigned each vector in the training data set to a homogeneous data cluster was generated. The cluster map contained 34 clusters, 17 benign and 17 malignant. Table 1 shows the location of each of data cluster of the map and the number of samples of the training set assigned to each cluster.

The classifying algorithm was tested using 231 samples that were excluded from the training data set. Six sets of samples from patients with various clinical and pathological diagnoses were used. The clinical and pathological description and the algorithm results were as follows: 1) 24 patients with PSA>4 ng/ml and biopsy proven cancer, 22 map to diseased data clusters, 2 map to no cluster; 2) 6 normal, all map to healthy clusters; 3) 39 with benign prostatic hypertrophy (BPH) or prostatitis and PSA<4 ng/ml, 7 map to diseased data clusters, none to healthy data clusters and 32 to no data cluster; 4) 139 with BPH or prostatitis and PSA>4 and <10 ng/ml, 42 map to diseased data clusters, 2 to healthy data clusters and 95 to no data cluster; 5) 19 with BPH or prostatitis and PSA>10 ng/ml, 9 map to diseased data clusters none to healthy and 10 to no data cluster. A sixth set of data was developed by taking pre- and post-prostatectomy samples from patients having biopsy proven carcinoma and PSA>10 ng/ml. As expected each of the 7 pre-surgical samples was assigned to a diseased data set. However, none of the sample taken 6 weeks post surgery, at a time when the PSA levels had fallen to below 1 ng/ml were not assignable to any data set.

When evaluating the results of the foregoing test, it should be recalled that the rate of occult carcinoma in patients having PSA of 4–10 ng/ml and benign biopsy diagnosis is about 30%. Thus, the finding that between 18% and 47% of the patients with elevated PSA, but no tissue diagnosis of cancer, is consistent with that correctly predicts the presence of carcinoma.

E. Summary of One Embodiment of the Invention

FIG. 1 is a control flow diagram showing the top level processing of the knowledge discovery engine. Processing beings at step 302 and immediately continues to step 304. In step 304, the KDE 202 processes the chromosome strings 204 using a genetic algorithm. The chromosome strings 204 comprise data strings that are to be analyzed. The genetic algorithm inputs the chromosome strings 204 and for each data string, identifies the chromosome variables contained within the chromosome string 204. The chromosome variables 208 define the variables that the KDE 202 will look for in each chromosome string 204.

The KDE 202 continues to step 306 and creates a lead cluster map, or grouping, for each processed chromosome string by using a pre-defined set of variables. The lead cluster map establishes clusters of data records around centroids in high order dimensional space. The membership of a record to a cluster is determined by Euclidean distance. If the Euclidean distance between a centroid and the record places the record inside a decision hyper-radius, the record belongs to the cluster surrounding the centroid. If the Euclidean distance between the record and any existing centroid is greater than the decision hyper-radius, the record establishes a new centroid and a new cluster. All data regarding the lead cluster mapping of the processed chromosome strings is recorded in the string/cluster database 310.

The KDE 202 continues to step 308 wherein for each lead cluster map, it computes a variance across all of the clusters contained within that lead cluster map and records the variance in the string/cluster database 310. This step determines how homogeneous a given chromosome string 204 is to a predefined set of chromosome variables. The means for determining cluster homogeneity is a statistical measure of the variability of records belonging to a cluster with respect to specific behaviors, outcomes, attributes or the like. In the preferred embodiment, variance is used as the measure of homogeneity, but this is for convenience. It would be readily apparent to one of ordinary skill in the relevant art to use any statistical measure.

Upon completion of step 308, the KDE 202 determines a best lead cluster map; that is, it determines which lead cluster map is the "best fit" with the given sets of chromosome variables.

The KDE 202 continues to step 314 to determine whether the best lead cluster map is less than an acceptable minimum. The acceptable minimum may either be input by the user, or pre-defined within the KDE 202.

If step 314 determines that the best lead cluster map is less than the acceptable minimum, then processing proceeds to step 316. In step 316, the KDE 202 records its final mapping in a chromosome map 210 and displays the best lead cluster map along with the matching variables.

Returning to step 314, if the KDE 202 determines that the best lead cluster map is not less than the acceptable minimum, the KDE 202 proceeds to step 312.

In step 312, the KDE 202 re-processes each processed chromosome string using the genetic algorithm. The genetic algorithm inputs the data for each processed chromosome string from the string/cluster database 310 and reanalyzes them according to the last set of information. After completing the re-ranking of the processed chromosome strings, the KDE 202 returns to step 306 to create new lead cluster maps for each processed chromosome string. The processing continues as described above.

What is claimed is:

1. A method for creating a model for classifying a biological sample as being of a first state or a second state different than the first state, comprising:
   obtaining a data string derived from each biological sample of a set known to be of the first state and a set known to be of the second state;
   selecting data elements from each data string using an evolutionary algorithm;
   determining the locations of a first set of vectors and a second set of vectors in a vector space, each vector of the first set of vectors corresponding to data elements derived from a biological sample known to be of the first state, each vector of the second set of vectors corresponding to data elements derived from a biological sample known to be of the second state; and
   identifying a model acceptable for classifying biological samples containing at least one cluster disposed within the vector space, the cluster containing at least one of the vectors of the first set of vectors and being associated with the first state for purposes of classifying a biological sample.

2. The method of claim 1, wherein the evolutionary algorithm is a genetic algorithm.

3. The method of claim 1, wherein the biological sample is selected from the group of biological samples consisting of serum, plasma, and biopsy specimen.

4. The method of claim 1, wherein identifying a model uses a pattern recognition algorithm.

5. The method of claim 1, wherein the data strings are of a type are selected from the group consisting of: (a) mass spectrometry data, (b) hybridization data, (c) gene expression data, and (d) microarray data.

6. The method of claim 1, wherein the acceptability of the model for classifying biological samples is based on the homogeneity of the cluster.

7. A software product having a model constructed using the method of claim 1.

8. A model constructed using the method of claim 1.

9. A method of creating a classifying pattern for objects using a plurality of data strings, each data string associated with one of a plurality of objects to be classified, comprising:
   selecting a set of data elements from each data string using a learning algorithm;
   classifying the set of data elements using a classifying algorithm; and
   repeating the selecting and classifying with a different set of data elements selected from each data string until a classifying pattern is created that is acceptable to classify the objects.

10. The method of claim 9, wherein the learning algorithm is an evolutionary algorithm.

11. The method of claim 9, wherein the learning algorithm is a genetic algorithm.

12. The method of claim 9, wherein the data strings are produced by a high-throughput assay.

13. The method of claim 9, wherein the data strings are of a type are selected from the group consisting of: (a) mass spectrometry data, (b) hybridization data, (c) gene expression data, (d) microarray data, (e) financial data, (f) stock market data, (g) text, (h) currency exchange rates, and (i) processing plant control status values.

14. The method of claim 9, wherein the objects are known to be of a first state or a second state and the model classifies objects by state.

15. The method of claim 9, wherein the objects are biological samples.

16. The method of claim 15, wherein classification of a sample provides information about a state selected from the group consisting of medical diagnosis and pathology.

17. The method of claim 15, wherein the sample is selected from the group of biological samples consisting of: serum, plasma, and biopsy specimen.

18. The method of claim 9, wherein the classifying algorithm is an adaptive pattern recognition algorithm.

19. The method of claim 18, wherein the pattern recognition algorithm creates a cluster map having a plurality of clusters associated with the set of data points.

20. The method of claim 19, wherein the acceptability of a grouping as a model to classify the objects is based on the homogeneity of the clusters in the cluster map.

21. The method of claim 20, wherein the model is the best lead cluster map.

22. The method of claim 19, wherein the grouping is acceptable as a model to classify the objects if a homogeneity of the cluster map is within a predetermined tolerance.

23. The method of claim 19, wherein the cluster map is created by
   calculating a vector for each set of data points; and
   mapping the vectors into a vector space.

24. The method of claim 23, further comprising:
   determining if a distance of at least one of the vectors from a closest preexisting centroid is within a predetermined threshold distance.

25. The method of claim 24, further comprising:
   assigning the vector to a cluster associated with the preexisting centroid if the distance is within the predetermined threshold distance, and the assigning the vector includes adjusting the location of the preexisting centroid closer to the location of the vector.

26. The method of claim 24, wherein if the distance exceeds the predetermined threshold difference, defining a new centroid based on the location of the vector in the vector space, and if the distance is less than the threshold difference, assigning the vector to a cluster associated with the preexisting centroid.

27. A software product having a model constructed using the method of claim 9.

28. A model constructed using the method of claim 9.

29. A method of constructing a model configured to classify objects as being of one of at least a first state and a second state different than the first state, comprising:
receiving a plurality of data strings, each data string being derived from an object known to be of the first state or the second state;
selecting a first set of variables that correspond with data in each of the plurality of data strings;
calculating a vector for each of the plurality of data strings using the first set of variables;
finding a location in a first vector space of each of at least two data clusters that best fit the vectors calculated using the first set of variables;
providing the locations in the first vector space of the at least two data clusters;
determining a variability for the at least two data clusters that best fit the vectors calculated using the first set of variables;
determining whether the variability of the at least two data clusters that best fit the vectors calculated using the first set of variables is within an acceptable tolerance;
if it is determined that the variability of the at least two data clusters that best fit the vectors calculated using the first set of variables is not within the acceptable tolerance,
using an evolutionary algorithm to select a second set of variables different than the first set of variables,
calculating a vector for each of the plurality of data strings using the second set of variables,
finding a location in a second vector space of each of at least two data clusters that best fit the vectors calculated using the second set of variables,
determining a variability for the at least two data clusters that best fit the vectors calculated using the second set of variables,
determining whether the variability for the at least two data clusters that best fit the vectors calculated using the second set of variables is within the acceptable tolerance, and
if it is determined that the variability of the at least two data clusters that best fit the vectors calculated using the second set of variables is within the acceptable tolerance, providing the locations in the second vector space of the at least two data clusters that best fit the vectors calculated using the second set of variables.

30. A model configured to classify objects as being of one of at least a first state and a second state different than the first state constructed using the method of claim 29.

31. A software product having a model constructed using the method of claim 29.

32. The method of claim 29, wherein the data strings are of a type are selected from the group consisting of: (a) mass spectrometry data, (b) hybridization data, (c) gene expression data, (d) microarray data, (e) financial data, (f) stock market data, (g) text, (h) currency exchange rates, and (i) processing plant control status values.

\* \* \* \* \*

UNITED STATES PATENT AND TRADEMARK OFFICE
CERTIFICATE OF CORRECTION

PATENT NO.        : 7,240,038 B2
APPLICATION NO.   : 11/273432
DATED             : July 3, 2007
INVENTOR(S)       : Ben Hitt Page 1 of 1

It is certified that error appears in the above-identified patent and that said Letters Patent is hereby corrected as shown below:

Column 3, line 42, after the word "chromosomes[1]", insert the footnote:

[1] The term logical chromosome is used in connection with genetic learning algorithms because the logical operations of the algorithm are analogous to reproduction, selection, recombination and mutation. There is, of course, no biological embodiment of a logical chromosome in DNA or otherwise. The genetic learning algorithms of the invention are purely computational devices, and should not be confused with schemes for biologically-based information processing.

Signed and Sealed this

Tenth Day of June, 2008

JON W. DUDAS
*Director of the United States Patent and Trademark Office*